(12) United States Patent
Ward, IV (10) Patent No.: US 11,086,651 B2
(45) Date of Patent: Aug. 10, 2021

(54) WORKFLOW VERSION MANAGEMENT

(71) Applicant: salesforce.com, inc., San Francisco, CA (US)

(72) Inventor: James Leslie Ward, IV, Crested Butte, CO (US)

(73) Assignee: salesforce.com, inc., San Francisco, CA (US)

( * ) Notice: Subject to any disclaimer, the term of this patent is extended or adjusted under 35 U.S.C. 154(b) by 174 days.

(21) Appl. No.: 16/257,061

(22) Filed: Jan. 24, 2019

(65) Prior Publication Data

US 2020/0242530 A1 Jul. 30, 2020

(51) Int. Cl.
| | |
|---|---|
| *G06F 9/00* | (2006.01) |
| *G06F 9/455* | (2018.01) |
| *G06Q 10/06* | (2012.01) |
| *G06Q 10/10* | (2012.01) |
| *G06F 16/25* | (2019.01) |
| *G06F 9/50* | (2006.01) |
| *G06F 3/06* | (2006.01) |
| *G06F 3/12* | (2006.01) |

(52) U.S. Cl.
CPC ........ *G06F 9/45558* (2013.01); *G06F 3/0647* (2013.01); *G06F 9/5038* (2013.01); *G06F 9/5088* (2013.01); *G06F 16/254* (2019.01); *G06Q 10/0633* (2013.01); *G06Q 10/06316* (2013.01); *G06Q 10/103* (2013.01); *G06F 3/127* (2013.01)

(58) Field of Classification Search
None
See application file for complete search history.

(56) References Cited

U.S. PATENT DOCUMENTS

| | | | |
|---|---|---|---|
| 7,221,377 B1 | 5/2007 | Okita et al. | |
| 7,581,011 B2 | 8/2009 | Teng | |
| 9,245,291 B1* | 1/2016 | Ballaro | G06Q 30/0635 |
| 10,657,474 B2* | 5/2020 | Moolman | G06F 16/958 |
| 10,713,084 B2* | 7/2020 | Stevens | G06F 9/5038 |
| 10,719,585 B2* | 7/2020 | Jefferson | G06F 40/166 |
| 2002/0188597 A1* | 12/2002 | Kern | G06Q 30/06 |
| 2004/0068424 A1 | 4/2004 | Lee et al. | |

(Continued)

*Primary Examiner* — Gurkanwaljit Singh
(74) *Attorney, Agent, or Firm* — Kowert, Hood, Munyon, Rankin & Goetzel, P.C.

(57) ABSTRACT

Techniques are disclosed relating to a system capable of processing instances of different versions of a workflow. The system may store workflow information indicating different versions of a workflow. The system may receive requests to create instances of the workflow. The requests may include a first request associated with a first, non-current version of the workflow and a second request associated with a second, different version of the workflow. The computer system may create a set of instances of the workflow, including a particular instance corresponding to the first request. The computer system may receive a request to migrate the particular instance to a particular version different from the non-current version associated with the first request. The computer system may migrate the particular instance to the particular version of the workflow, such that subsequently received instance data for the migrated particular instance is processed according to the particular version.

18 Claims, 8 Drawing Sheets

(56) References Cited

U.S. PATENT DOCUMENTS

| | | | | |
|---|---|---|---|---|
| 2014/0027515 | A1* | 1/2014 | Simske | G06Q 50/00 |
| | | | | 235/454 |
| 2015/0100547 | A1* | 4/2015 | Holmes-Higgin | G06F 16/27 |
| | | | | 707/610 |
| 2015/0363555 | A1* | 12/2015 | Studsrud | G16H 40/20 |
| | | | | 705/2 |
| 2016/0196131 | A1* | 7/2016 | Searle | H04L 29/06 |
| | | | | 717/173 |
| 2017/0039046 | A1* | 2/2017 | Henke | G06Q 10/0633 |
| 2017/0185754 | A1* | 6/2017 | Jefferson | G06F 40/166 |
| 2017/0337255 | A1* | 11/2017 | Holmes-Higgin | G06F 8/61 |
| 2018/0247243 | A1* | 8/2018 | Moolman | G06F 8/34 |
| 2019/0129746 | A1* | 5/2019 | Stevens | G06F 9/5038 |

* cited by examiner

WORKFLOW VERSION MANAGEMENT

BACKGROUND

Technical Field

This disclosure relates generally to a system that is capable of managing instances of a workflow according to different versions of the workflow.

Description of the Related Art

Obtaining a desired outcome or implementing a solution on a computer system is often achieved through executing a workflow, which specifies performing various tasks in a particular order. There are many possible examples of workflows. For example, instantiating a web-based platform may involve the tasks of starting a database server, an application server, a mail server, a domain name system (DNS) server, etc. Some tasks in a workflow may be performed by computer systems, while others are performed by users. Thus, in an exemplary workflow, one task might involve obtaining approval from a particular user, while another task might involve determining whether an application can be complied for execution. In some cases, the constituent parts of a given workflow may change over time.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, for multiple versions of a workflow, the terms "first" version and "second" version can be used to refer to any version of the multiple versions. In other words, the first and second version are not limited to the initial two versions of the multiple versions.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A workflow is often changed overtime by users. For example, a user may be presented with a graphical user interface that allows the user to edit the definition of a workflow. When a user edits the definition, a new version of the workflow is created. Current workflow systems, however, support only one version of a workflow. Thus, when a new version of the workflow is created, the previous version is overwritten or discarded and all in-progress or new instances of the workflow are forced to adhere to (or comply with) the new version. This means that the older instances have to be updated to the new version; however, this process often requires a great deal of time and resources. Moreover, new instances may not be created based on older versions of a workflow as such versions were overwritten. It might thus be desirable to support multiple, different versions of a workflow.

The present disclosure describes various techniques for implementing an architecture capable of supporting multiple, different versions of a workflow. In various embodiments that are described below, a system maintains workflow information that defines different versions (or definitions) of a workflow. The system may further associate each of those versions of the workflow with an identifier that is usable to access the corresponding version. The system, in various embodiments, creates instances of the workflow, each of which is associated with one of the different versions of the workflow. Accordingly, when processing a particular instance of the workflow, the system may retrieve the appropriate version (using its identifier) and may process the particular instance in accordance with the retrieved version. In some embodiments, the system allows for instances to be migrated between different versions, including migrating an instance to an earlier version of the workflow. When migrating from one version to another version, the system may determine whether any conflicts exist in performing the migration. If conflicts exist, the system may present a user with an interface that allows that user to resolve those conflicts. After a particular instance has been merged to a different version, that instance may be processed according to that different version.

Figure 1A:
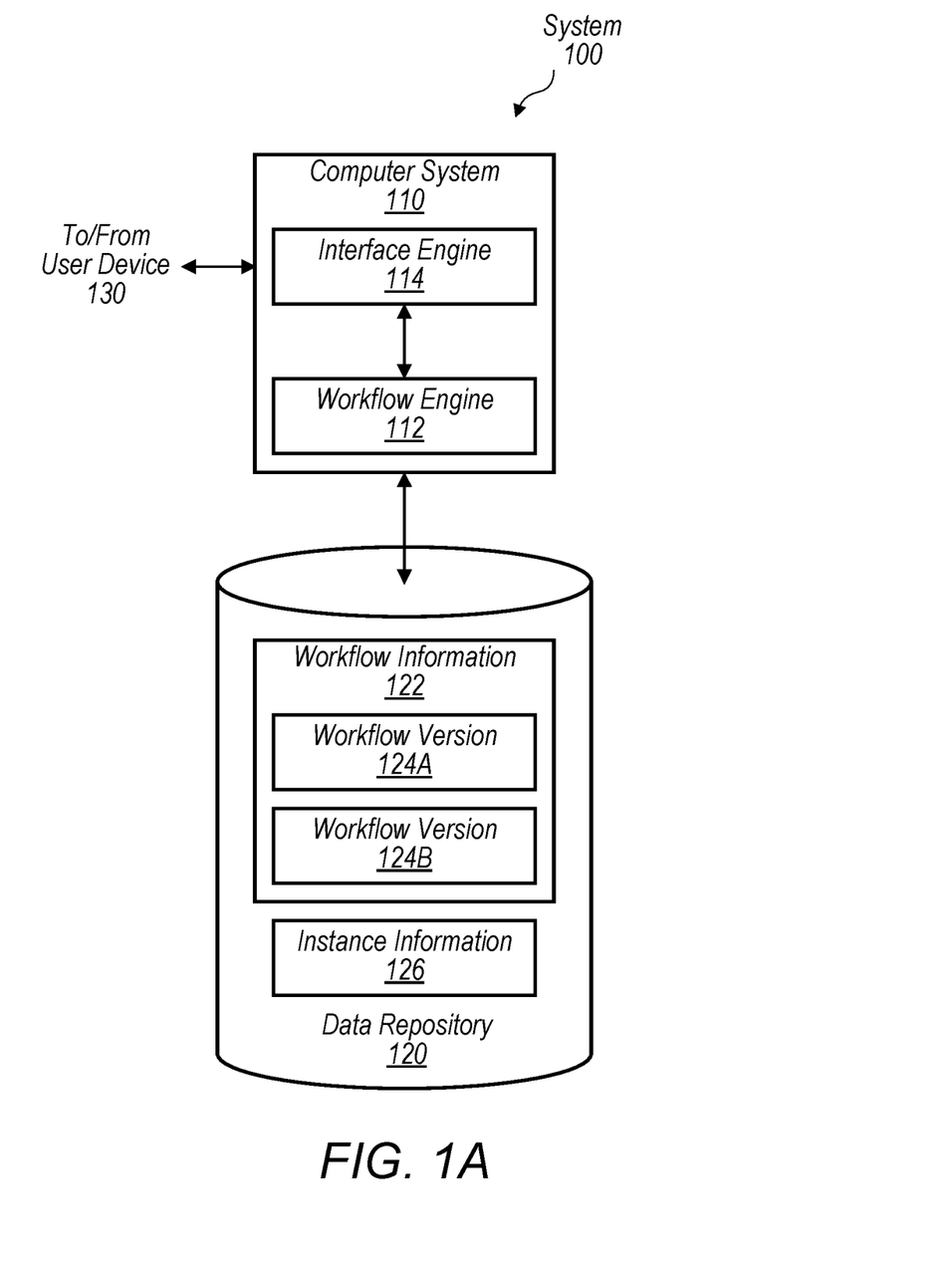
FIG. 1A is a block diagram illustrating example elements of a system that is capable of processing instances of different versions of a workflow, according to some embodiments.

These techniques may be advantageous over prior approaches as these techniques allow for multiple, different versions of a workflow to be supported. Accordingly, instances of a workflow that are based on older versions of the workflow do not have to be forcibly updated to the newest version of the workflow. This may save both time and resources. Additionally, instances may be created according to previous versions or migrated to previous versions. This may allow for certain instances that would benefit from a previous version to obtain that benefit from the previous version. For example, an instance may be created based on the latest version of a workflow and then migrated to an earlier version that includes a particular task that is not found in the latest version. An example system for implementing such techniques will now be discussed below, starting with FIG. 1.

Figure 1B:
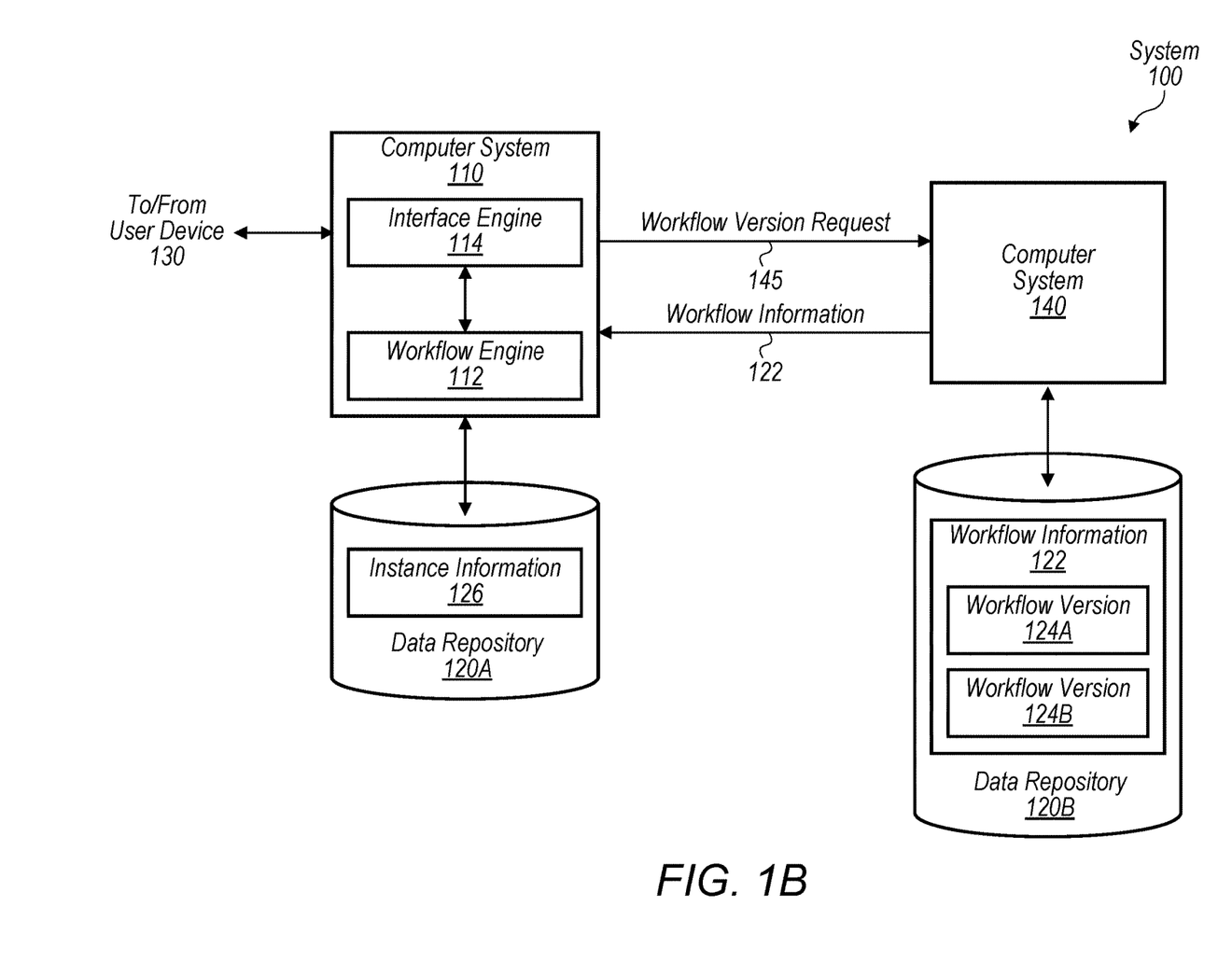
FIG. 1B is a block diagram illustrating example elements of a system that is capable of processing instances of different versions of a workflow, according to some embodiments.

Turning now to FIG. 1A, a block diagram of a system 100 is shown. System 100 is a set of components that are implemented via hardware or a combination of hardware and software routines. In the illustrated embodiment, system 100 includes a computer system 110 and a data repository 120. As further depicted, computer system 110 includes a workflow engine 112 and an interface engine 114, and data repository 120 includes workflow information 122 and instance information 126. In some embodiments, system 100 is implemented differently than shown—e.g., as shown in FIG. 1B, workflow information 122 may be included in a data repository that is managed by a different computer system than computer system 110.

Computer system 110, in various embodiments, facilitates the instantiation of instances of a workflow that are managed according to different, respective versions of the workflow. In some instances, computer system 110 may interact with other computer systems such as user devices 130 that issue requests for instances of a workflow and database systems that manage access to workflow information 122, which may be used to process instances. As depicted in FIG. 1A, computer system 110 may access workflow information 122 and instance information 126 from data repository 120. Such information, in various embodiments, may be provided to workflow engine 112 as part of processing instances of a workflow.

Workflow engine 112, in various embodiments, instantiates instances of workflows and processes those instances according to different versions of those workflows. An instance of a workflow, in various embodiments, is an implementation or occurrence of that workflow. For example, consider a workflow that involves shipping a product. One instance of that workflow may pertain to a particular shipment of that product that progresses through the tasks that are defined for the workflow (e.g., tasks such as placing the product into a container, labeling the container, placing the container onto a truck, etc.). When workflow engine 112 instantiates an instance of a workflow, in various embodiments, workflow engine 112 associates that instance with a specific version 124 of the workflow. Accordingly, when a given instance is processed, workflow engine 112 may process the instance according to the specific version 124 associated with it. In various embodiments, workflow engine 112 maintains instance information 126 for each instance and workflow information 122 that defines how to process those instances.

Workflow information 122, in various embodiments, is information that defines one or more different versions of a workflow. As shown in FIG. 1A, workflow information 122 defines two versions: workflow version 124A and workflow version 124B. In various embodiments, a workflow version 124 includes metadata that describes properties of a workflow. The metadata may, for example, describe the tasks of a workflow and the flow (e.g., trigger events) between those tasks. For example, a workflow may involve obtaining approval to open source computer code. Accordingly, a version 124 of that workflow may specify a task that involves filling out a form, a task that involves emailing in-house counsel, and a task that involves determining if licenses should be obtained. That version 124 may further indicate a flow between tasks such as, for example, which tasks are to follow the task involving the form. In various embodiments, workflow information 122 may correspond to more than one workflow and specify different versions 124 for each of those workflows.

In various cases, the difference between two versions 124 of a workflow may be based on the tasks specified by those versions. As an example, workflow version 124A might specify two tasks for a particular workflow while workflow version 124B might specify an additional task for that workflow. Accordingly, processing an instance based on workflow version 124B may be different than processing an instance based on workflow version 124A because of, for example, the additional task. As another example, workflow version 124A may specify a field (e.g., a name field in a form) that is not defined in workflow version 124B. In some instances, a given version 124 of a workflow may be an updated version of another version 124. As such, in various embodiments, workflow information 122 identifies the history between versions 124 and indicates the most current version 124 of a workflow.

Instance information 126, in various embodiments, is information corresponding to one or more instances of a workflow. In various cases, workflow engine 112 may receive a request (e.g., from a user) to create an instance of a particular workflow. Accordingly, workflow engine 112 may create an instance of that particular workflow, which may involve allocating instance information 126 for the instance. Such instance information 126 may specify a reference to the particular version 124 associated with that instance; that reference may be used to access that particular version from data repository 120. Instance information 126 may further identify the current task being performed, the users involved in the instance, the data that has been provided for the instance (e.g., the values provided for fields defined by the associated version 124), and the particular tasks of the workflow that have been included in the instance. In some instances, instance information 126 may be supplemented by data received from interface engine 114.

Interface engine 114, in various embodiments, facilitates communication of workflow engine 112 with users. Accordingly, interface engine 114 may generate a user interface that is presented to users via user devices 130. Such an interface may enable a user to request that an instance of a particular workflow be instantiated. Additionally, in various cases, the interface may be used by the user to provide data for instantiated instances; such data may be stored as part of instance information 126. For example, if a particular task involves filling out a form, then a user may provide data in the form of answers to the fields defined by the form. In some embodiments, the user interface can be used to update or provide new versions 124. In various embodiment, the user interface can be used to migrate an instance between workflow versions 124 of a workflow.

An instance of a workflow, in various embodiments, may be migrated from one version 124 of the workflow to another version 124. As an example, an instance originally instantiated based on workflow version 124A might be migrated to workflow version 124B. Accordingly, subsequent processing of that instance may be performed according to workflow version 124B and not workflow version 124A. When migrating an instance from one version 124 to another version 124, in various embodiments, workflow engine 112 determines whether any conflicts exist in performing the migration. Such conflicts may pertain to new fields, tasks, etc. defined in the migrated-to version 124 that need to be processed/performed. For example, the migrated-to version 124 may define a new field in a form that the user previously filled out in accordance with the older version 124. As such, when migrating to that migrated-to version 124, workflow engine 112 may detect that conflict (i.e., the new field) and cause an interface to be presented to the user for resolving that conflict (e.g., providing a value for the new field). In response to all conflicts being resolved, workflow engine 112 may update an instance (e.g., update instance information 126 for the instance) to be associated with the migrated-to version 124.

In one example implementation of system 100, computer system 110 may receive, from a user device 130, a workflow version 124A that defines a version of a workflow pertaining to a process for open sourcing computer code. Computer system 110 may maintain that workflow version 124A as workflow information 122 in data repository 120. Computer system 110 may then receive a request, from a user device 130, to create an instance of the workflow based on workflow version 124A. Accordingly, workflow engine 112 may create the instance, including allocating instance information 126 for that instance that specifies a reference to the associated workflow version 124A. Workflow engine 112 may then process that instance by progressing through the process for open sourcing computer code as defined by workflow version 124A.

Continuing with the example implementation, computer system 110 may receive, from a user device 130, a workflow version 124B defining a different version of the workflow than workflow version 124A. Computer system 110 may maintain that workflow version 124B as part of workflow information 122 in data repository 120. Computer system 110 may receive a request, from a user device 130, to migrate the created instance from workflow version 124A to workflow version 124B. Accordingly, workflow engine 112 may detect differences between workflow version 124A and workflow version 124B. Workflow engine 112 may then present, to a user via a user interface, any conflicts that exist in performing the migration. The user may resolve those conflicts. Thereafter, workflow engine 112 may update instance information 126 to identify, for that instance, workflow versions 124B. Accordingly, subsequent processing of the instance may be performed according to workflow version 124B. The particulars of another example layout of system 100 will now be discussed below.

Turning now to FIG. 1B, a block diagram of another example implementation of system 100 is shown. In the illustrated embodiment, system 100 includes computer system 110, a data repository 120A, a computer system 140, and a data repository 120B. As further depicted, data repository 120A includes instance information 126 while repository 120B includes workflow information 122.

As discussed in detail with respect to FIG. 1A, workflow information 122 and instance information 126 may be stored in the same data repository 120. With respect to the layout that is illustrated in FIG. 1B, however, workflow information 122 may be stored in a separate data repository 120 (depicted in FIG. 1B as data repository 120B) than instance information 126. As depicted, data repository 120B is managed by a computer system 140, separate from computer system 110. Computer system 140 and computer system 110 may be separate in that they are managed by different entities (e.g., companies) and/or operate under different domains. As an example, computer system 110 may be operated by SALESFORCE and computer system 140 may be operated by GITHUB—each operating under their respective domain. Accordingly, by separating instance information 126 and workflow information 122, the techniques discussed in this disclosure may take advantage of particular properties (e.g., version control) provided by preexisting systems (e.g., GITHUB) while protecting personal and confidential information that may be provided during a workflow and stored as instance information 126.

In various embodiments, when computer system 110 receives, from a user device 130, information defining a workflow version 124, computer system 110 may send that information to computer system 140. Computer system 140 may store that information in data repository 120B and may associate the defined workflow version 124 with an identifier usable by computer system 110 to retrieve that workflow version. In various cases, the identifiers may be defined by computer system 140 instead of computer system 110 (which may define the identifiers in the layout discussed with respect to FIG. 1A). In some embodiments, a user (via a user device 130) may directly provide computer system 140 with information defining a workflow version 124.

When instantiating an instance of a workflow, computer system 110 may store, for the instance information 126 of that instance, the identifier corresponding to the workflow version 124 associated with instance. Accordingly, when processing an instance, computer system 110 may issue a workflow version request 145 to computer system 140. Workflow version request 145 may include an identifier of a particular workflow version 124. As such, computer system 140 may retrieve, based on the identifier that is defined in a workflow version request 145, the appropriate workflow version 124 from data repository 120B. Computer system 140 may then return that workflow version 124 as workflow information 122 to computer system 110.

Figure 2:
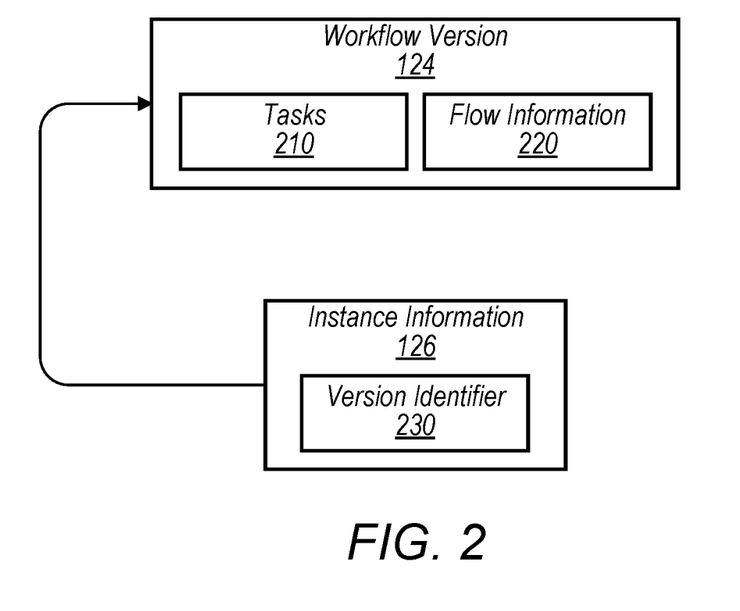
FIG. 2 is a block diagram illustrating example elements of instance information and a workflow version, according to some embodiments.

Turning now to FIG. 2, a block diagram illustrating a relationship between a workflow version 124 and instance information 126 is shown. In the illustrated embodiment, workflow version 124 includes tasks 210 and flow information 220 and instance information 126 includes version identifier 230. While not shown, in various embodiments, more than one instance of a workflow may include an identifier pointing to the same workflow version 124.

As explained earlier, a workflow version 124 may include metadata that describes the properties of a workflow. As illustrated in FIG. 2 for example, workflow version 124 describes tasks 210 and flow information 220. While not illustrated, workflow version 124 may provide other information such as the possible states (e.g., complete, in-progress, etc.) that an instance of a workflow may be in.

Tasks 210, in various embodiments, define operations that are to be performed as part of carrying out a workflow. For example, carrying out a workflow that involves open sourcing computer code may include a task in which a developer of the code fills out a form. There may be different types of tasks 210 such as an "input" task 210 where input from a user is needed, an "action" task 210 where the user needs to perform some action such as uploading code, or an "approval" task 210 where the user needs to obtain approval from another user. Tasks 210 may also specify who can complete those tasks (e.g., a manager has to give approval). In some embodiments, a given task 210 is associated with flow information 220.

Flow information 220, in various embodiments, defines the flow between tasks 210 of a workflow. Flow information 220 may include task events that define one or more actions to be performed in response to one or more event triggers. As an example, in response to an event trigger where a manager provides approval, workflow engine 112 may send a notification to a user about the approval and may instigate another task 210. Accordingly, flow information 220 may define, for a given task 210, a set of criteria associated with that given task 210 that control the flow from that given task 210 to other tasks 210. Consider a task 210 in which a user fills out a form. Flow information 220 may indicate which tasks 210 to instigate based on the values provided by the user in that form.

In various embodiments, when a user sends a request to workflow engine 112 to create an instance of a workflow, the user may specify which tasks 210 to include in the instance of the workflow. Accordingly, interface engine 114 may cause a user interface to be presented to a user for selecting tasks 210. The particular tasks 210 that a user can add to an instance may be based on the workflow version 124 associated with that instance. In some cases, a user may migrate an instance to a different workflow version 124 in order to be able to add certain tasks 210 that are not available in the currently associated workflow version 124. A user may remove tasks 210 from an instance of a workflow. Since a user may add or remove tasks 210, in various cases, a given instance may be different than another instance even when they are both based on the same workflow version 124. In some embodiments, when an instance is created, it may include a default set of tasks 210 such that a user may not want to add or remove tasks 210.

When an instance is created by workflow engine 112, in various embodiments, instance information 126 is allocated for that instance. Such instance information 126 may specify, for the instance, a version identifier 230 that identifies the workflow version 124 that is associated with that instance. Accordingly, when processing a given instance, workflow engine 112 may use the version identifier 230 stored for that given instance to retrieve the appropriate workflow version 124.

Version identifier 230, in various embodiments, specifies a value that is unique among workflow versions 124 such as a random string of character values. The version identifier 230 associated with a workflow version 124 may be defined when that version 124 is stored at data repository 120A or 120B. The version identifier 230 associated with a workflow version 124 may be defined by computer system 110 or computer system 140—this may depend on which system is storing the workflow version 124 at the data repository 120.

Figure 3:
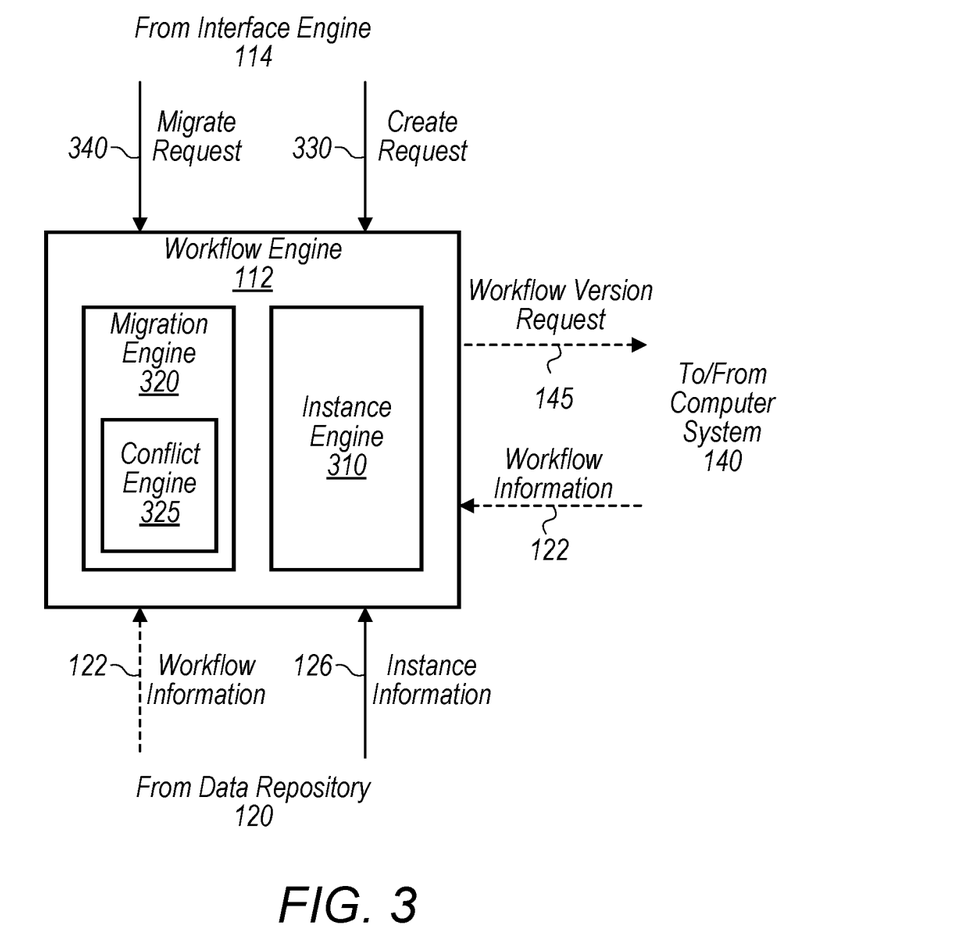
FIG. 3 is a block diagram illustrating example elements of a workflow engine that can process instances of different versions of a workflow, according to some embodiments.

Turning now to FIG. 3, a block diagram of a workflow engine 112 is shown. In the illustrated embodiment, workflow engine 112 includes an instance engine 310 and a migration engine 320. As further shown, migration engine 320 includes a conflict engine 325. In some embodiments, workflow engine 112 may be implemented differently than shown. For example, workflow engine 112 may not include conflict engine 325.

Instance engine 310, in various embodiments, creates instances of a workflow that are each associated with a workflow version 124. Instance engine 310 may create a given instance in response to receiving a create request 330 from interface engine 114—such a create request may originate from a user of a user device 130. In some cases, create request 330 may specify a particular workflow version 124 on which to create an instance; in other cases, create request 330 may not specify a workflow version 124. Accordingly, instance engine 310 may create the instance accordingly a default workflow version 124, which in various cases, may be the most recent/current workflow version 124.

When creating or processing an instance, in various embodiments, instance engine 310 accesses workflow information 122. In some embodiments, instance engine 310 accesses such workflow information from a data repository 120 that is local to computer system 110. In yet other embodiments, instance engine 310 accesses workflow information 122 from an external data repository 120 managed by computer system 140. Instance engine 310 may retrieve the relevant workflow version 124 of workflow information 122 for an instance by first retrieving instance information 126 for that instance. Accordingly, instance engine 310 may retrieve the relevant workflow version 124 using the version identifier 230 included in the retrieve instance information 126. Instance engine 310 may then process the instance according to the retrieved workflow version 124.

Migration engine 320, in various embodiments, migrates instances from one workflow version 124 to another workflow version 124 of a workflow. Migrating between versions 124 may involve determining whether conflicts occur in performing the migration. Accordingly, in various embodiments, migration engine 320 includes conflict engine 325. Conflict engine 325, in various embodiments, analyzes the two workflow versions 124 and the instance information 126 involved in a migration to determine conflicts. In various cases, conflict engine 325 may compare two workflow versions 124 to determine differences between them. Such differences may be indicative of conflicts. As an example, the migrated-to version 124 may include a new task 210 that needs to be performed before another particular task 210; however, the user may have already performed the other particular task 210 under the previous version 124. As such, migration engine 320 may cause the user to resolve this conflict by performing the new task 210 and then the other particular task 210. In some embodiments, migration engine 320 causes interface engine 114 to present an interface to a user for resolving any conflicts identified by conflict engine 325.

When migrating to a different workflow version 124, in some embodiments, workflow engine 112 continues to maintain portions of instance information 126 that may not be relevant to the different version 124. For example, if a user provides input for a particular task 210, but that task 210 is not included in the different version 124, workflow engine 112 may still store the provided input. Accordingly, if the user were to migrate back to the previous version 124 or another version 124 that includes that particular task 210, then the input previously provided by the user may be used again.

Figure 4:
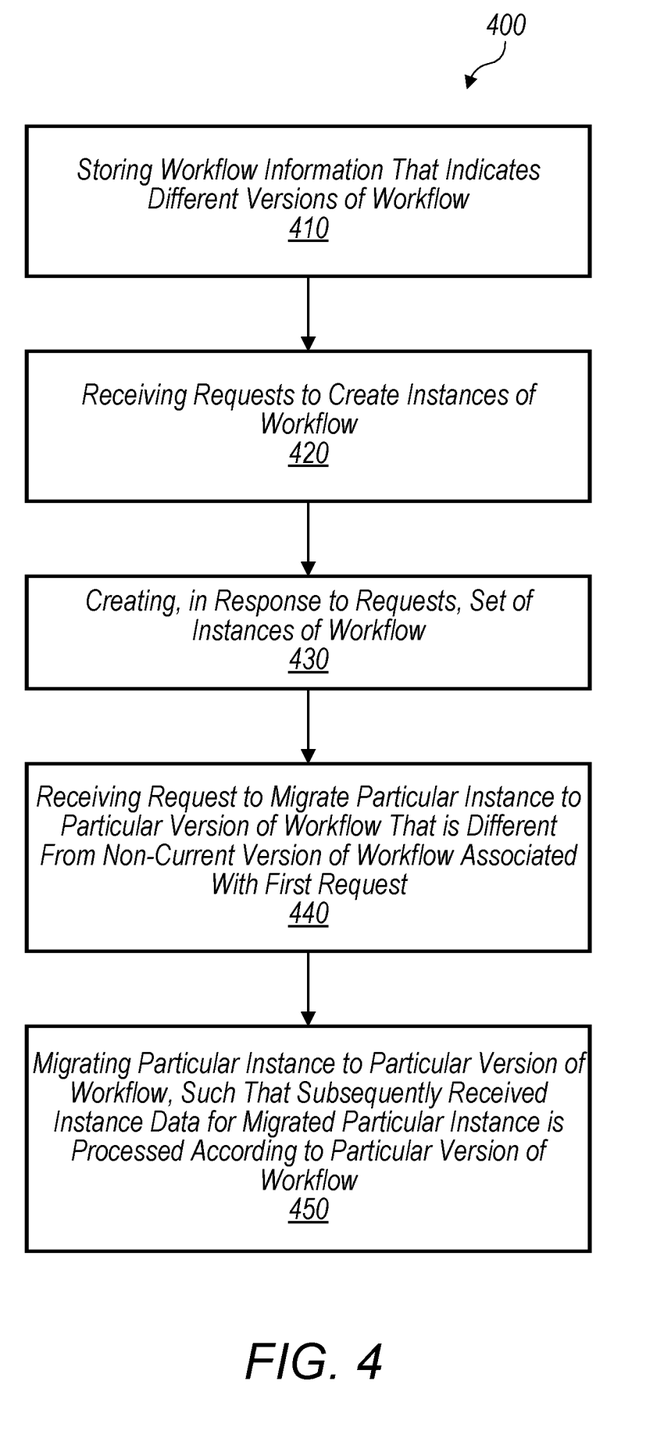
FIGS. 4-6 are flow diagrams illustrating example methods relating to handling instances of different versions of a workflow, according to some embodiments.

Turning now to FIG. 4, a flow diagram of a method 400 is shown. Method 400 is one embodiment of a method performed by a computer system (e.g., computer system 110) in order to manage instances of a workflow. In some embodiments, method 400 may include additional steps than shown. For example, method 400 may include a step in which the computer system determines whether any conflicts exist as a part of migrating a particular instance to a particular version (e.g., a particular workflow version 124).

Method 400 begins in step 410 with a computer system storing workflow information (e.g., workflow information 122) that indicates different versions (e.g., workflow version 124A and 124B) of a workflow. The different versions may include a current version of the workflow (e.g., a workflow version 124 corresponding to the newest/latest version of the workflow). In various embodiments, the different versions of the workflow each respectively define one or more tasks (e.g., tasks 210) that are available for use in instances of the workflow. The different versions may each be associated with a unique identifier (e.g., version identifier 230) usable to access that version. In some instances, storing the workflow information includes the computer system causing a different computer system (e.g., computer system 140) to maintain that workflow information at a data repository (e.g., data repository 120B) of the different computer system. The computer system performing method 400 and the different computer system may each be associated with a respective, different domain (or may be handled by a respective, different entity). The respective unique identifier for each of the different versions indicated in the workflow information may be defined by the different computer system.

In step 420, the computer system receives requests (e.g., create requests 330) to create instances of the workflow. The requests may include a first request associated with a first, non-current version of the workflow and a second request that is associated with a second, different version of the workflow. In some cases, the second, different version is the current version of the workflow.

In step 430, the computer system creates, in response to the requests, a set of instances of the workflow. Each of the created set of instances may store data associated with processing of that instance (e.g., instance information 126 that includes, e.g., data provided by a user). The created set of instances may include a particular instance that corresponds to the first request and another instance that corresponds to the second request. Each of the created set of instances may store (or be associated with) the unique identifier of the version with which that instance is associated.

In step 440, the computer system receives a request (e.g., migrate request 340) to migrate the particular instance to a particular version of the workflow that is different from the non-current version of the workflow associated with the first request. In various instances, the particular version may define at least one task that is different than the one or more tasks that are defined by the non-current version of the workflow associated with the first request.

In step 450, the computer system migrates the particular instance to the particular version of the workflow, such that subsequently received instance data for the migrated particular instance is processed according to the particular version of the workflow. As part of the migrating, the computer system may determine if any conflict exists in performing the migration. In response to determining at least one conflict involved in the migrating, in various embodiments, the computer system causes an interface to be presented to a user for resolving the at least one conflict.

The computer system may process received instance data for the migrated particular instance. Such processing may include accessing the particular version of the workflow using the unique identifier that is associated with the particular version and stored for the migrated particular instance. In some instances, accessing the particular version includes the computer system requesting the particular version from the different computer system.

Figure 5:
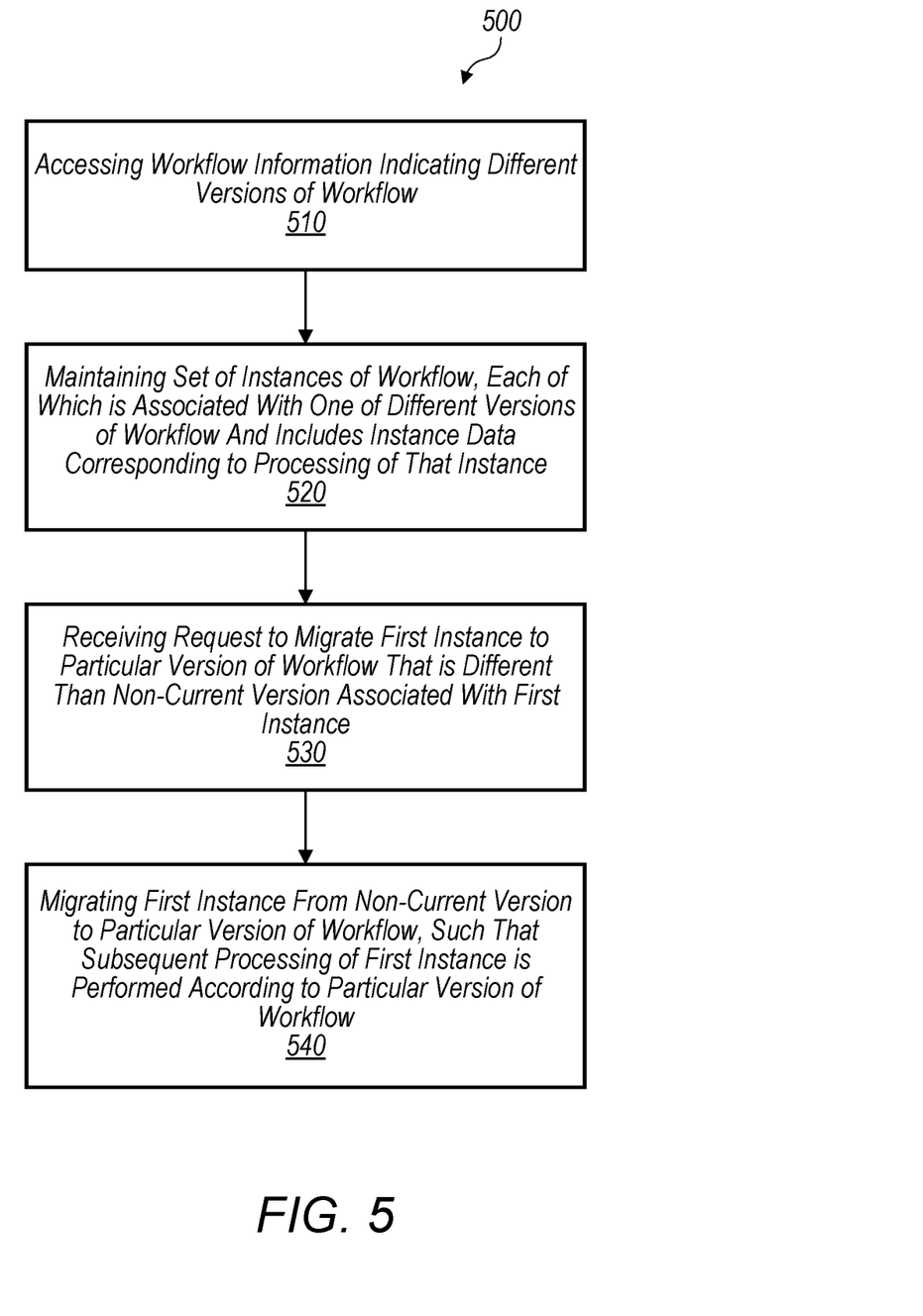

Turning now to FIG. 5, a flow diagram of a method 500 is shown. Method 500 is one embodiment of a method performed by a computer system (e.g., computer system 110) in order to manage instances of a workflow. In some cases, method 500 may be performed by executing a set of program instructions stored on a non-transitory computer-readable medium. In some embodiments, method 500 may include additional steps. For example, the computer system may cause an interface to be presented to a user that allows for tasks to be added to instances, where tasks available to be added to a given instance are based on the version associated with that given instance.

Method 500 begins in step 510 with the computer system accessing workflow information (e.g., workflow information 122) indicating different versions (e.g., workflow versions 124) of a workflow. In various instances, the different versions may include a current version of the workflow and one or more non-current versions of the workflow;

In step 520, the computer system maintains a set of instances of the workflow, each of which is associated with one of the different versions of the workflow and includes instance data (e.g., instance information 126) corresponding to processing of that instance. In various embodiments, in response to receiving a request (e.g., create request 33) to create a given instance of the workflow, the computer system creates the given instance based on the current version of workflow. A first one of the instances in the set may be associated with one of the one or more non-current versions and a second one of the instances in the set may be associated with the current version.

In step 530, the computer system receives a request (e.g., migrate request 340) to migrate the first instance to a particular version of the workflow that is different than the non-current version associated with the first instance.

In step 540, the computer system migrates the first instance from the non-current version to the particular version of the workflow, such that subsequent processing of the first instance is performed according to the particular version of the workflow. In some cases, when migrating, the computer system may determine, based on one or more differences between the non-current version and the particular version, one or more issues involved in migrating the first instance to the particular version. Accordingly, the computer system may cause an interface to be presented to a user for resolving the one or more issues. In various cases, when migrating the first instance to the particular version, the computer system may maintain a portion of the instance data of the first instance that defines one or more values that correspond to the non-current version, but are not used by the particular version of the workflow.

Figure 6:
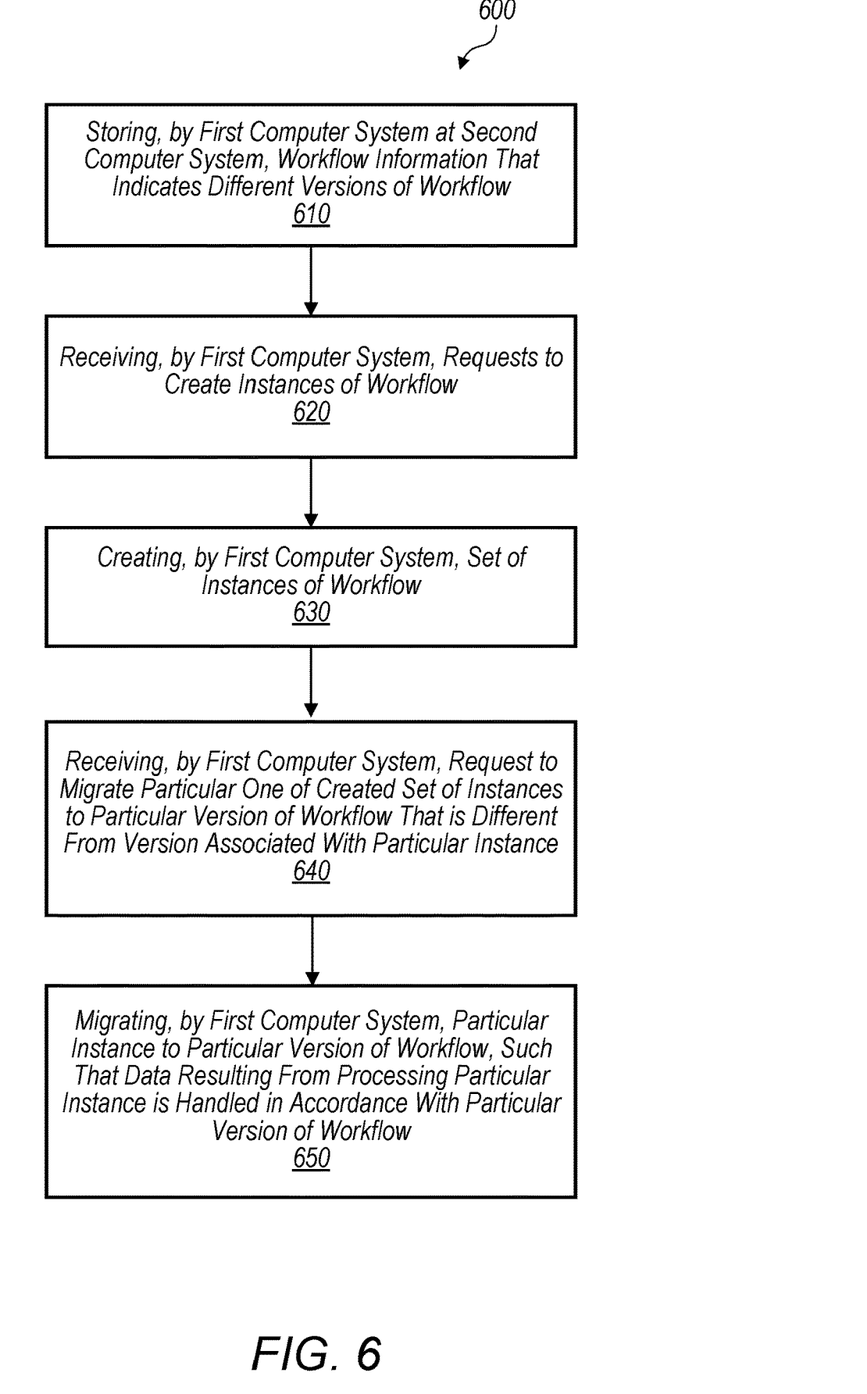

Turning now to FIG. 6, a flow diagram of a method 600 is shown. Method 600 is one embodiment of a method performed by a first computer system (e.g., computer system 110) to manage instances of a workflow. In some embodiments, method 600 may include additional steps. For example, the computer system may receive, from a user via a user device (e.g., user device 130), a new version (e.g., workflow version 124) of the workflow.

Method 600 begins in step 610 with the first computer system storing, at a second computer system (e.g., a system comprising computer system 140 and data repository 120B), workflow information (e.g., workflow information 122) that indicates different versions of a workflow. In various embodiments, the workflow information is accessible via the second computer system. A given one of the different versions may specify a set of properties of the workflow, and data resulting from processing an instance that is associated with the given version may include one or more data values that correspond to one or more properties in the set of properties. One of the set of properties may specify a user input field. Accordingly, the data resulting from processing the instance may include a particular data value provided by a user for the user input field.

In step 620, the first computer system receives requests (e.g., create requests 330) to create instances of the workflow.

In step 630, the first computer system creates a set of instances of the workflow. Each of the created set of instances may be associated with a respective one of the different versions, and data resulting from processing a given one of the created set of instances may be stored at a data repository (e.g., data repository 120A) local to the first computer system.

In step 640, the first computer system receives a request (e.g., migrate request 340) to migrate a particular one of the created set of instances to a particular version of the workflow that is different from the version associated with the particular instance.

In step 650, the first computer system migrates the particular instance to the particular version of the workflow, such that data resulting from processing the particular instance is handled in accordance with the particular version of the workflow. As part of the migrating, the first computer system may access, via the second computer system, the version associated with the particular instance and the particular version. The first computer system may determine whether conflicts exist in migrating the particular instance to the particular version and may cause an interface to be presented to a user associated with the particular instance for resolving any determined conflicts in migrating the particular instance to the particular version. In some cases, the particular instance may be migrated from a non-current version of the workflow to a current version of the workflow.

Exemplary Computer System

Figure 7:
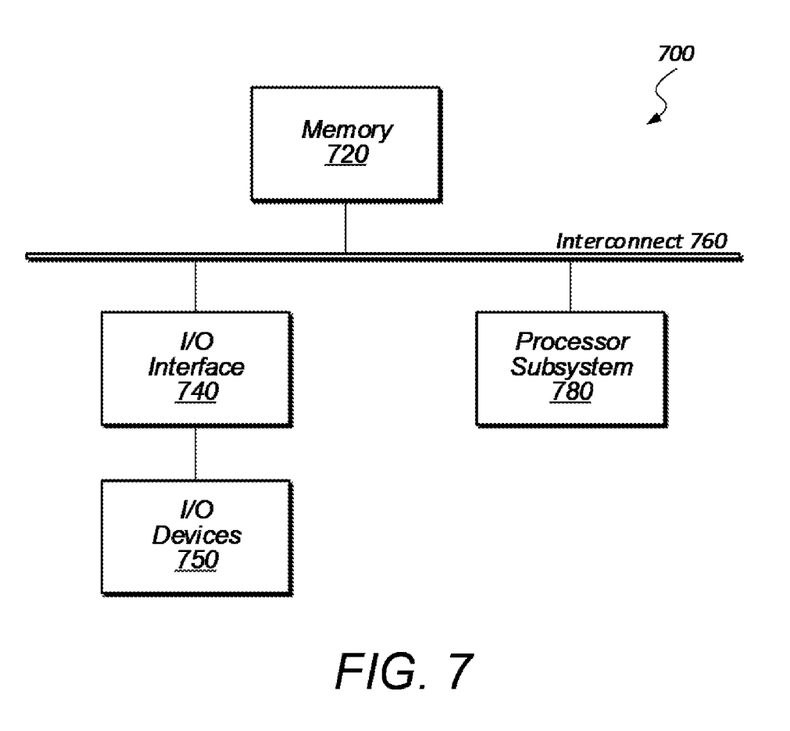
FIG. 7 is a block diagram illustrating an example computer system, according to some embodiments.

Turning now to FIG. 7, a block diagram of an exemplary computer system 700, which may implement computer system 110 and/or computer system 140 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement workflow engine 112, interface engine 114, instance engine 310, migration engine 320, and conflict engine 325 may be included (or stored) within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
storing, by a computer system, workflow information that indicates different versions of a workflow, wherein the different versions include a current version of the workflow;
receiving, by the computer system, requests to create instances of the workflow, wherein the requests include a request to create an instance having a first version of the workflow;
creating, by the computer system, a set of instances of the workflow based on the requests, wherein each of the created set of instances stores data associated with processing of that instance, and wherein the created set of instances includes the instance having the first version;
receiving, by the computer system, a request to migrate the instance to a second, earlier version of the workflow that defines a task that is not present in the first version; and
migrating, by the computer system, the instance to the second version of the workflow such that subsequently received instance data for the migrated instance is processed according to the second version, wherein the migrating includes:
determining that a conflict exists in migrating the instance from the first version to second version, wherein the conflict relates to the task; and
causing an interface to be presented to a user for resolving the conflict.

2. The method of claim 1, wherein the different versions are each associated with a unique identifier that is usable to access that version, and wherein each of the created set of instances stores the unique identifier of the version with which that instance is associated.

3. The method of claim 2, further comprising:
processing, by the computer system, received instance data for the migrated instance, wherein the processing includes accessing the second version of the workflow using the unique identifier associated with the second version and stored for the migrated instance.

4. The method of claim 3, wherein the storing includes the computer system causing a different computer system to maintain the workflow information, and wherein the second version of the workflow is accessed from the different computer system.

5. The method of claim 4, wherein the respective unique identifier for each of the different versions indicated in the workflow information is defined by the different computer system.

6. The method of claim 4, wherein the computer system and the different computer system are each associated with a respective, different domain.

7. The method of claim 1, wherein the first version is the current version of the workflow.

8. The method of claim 1, wherein the first version is an intermediate version between the second version and the current version of the workflow.

9. The method of claim 1, wherein the different versions of the workflow each define one or more tasks available for use in instances of the workflow.

10. The method of claim 1, wherein the computer system includes an instance engine and a migration engine having a conflict engine for facilitating an implementation of a workflow, and wherein the computer system executes the instance engine to perform the creating of the set of instances of the workflow, the migration engine to perform the migrating, and the conflict engine to perform the determining that a conflict exists.

11. A non-transitory computer readable medium having program instructions stored thereon that are capable of causing a computer system to perform operations comprising:
accessing workflow information indicating different versions of a workflow, wherein the different versions include a current version of the workflow and one or more non-current versions of the workflow;
maintaining a set of instances of the workflow, each of which is associated with one of the different versions of the workflow and includes instance data corresponding to processing of that instance, wherein one of the instances in the set is associated with a first version of the different versions;
receiving a request to migrate the instance to a second version of the workflow that is different than the first version, wherein the second version defines a task that is not present in the first version; and
migrating the instance from the first version to the second version of the workflow, such that subsequent processing of the instance is performed according to the second version of the workflow, wherein the migrating includes:
determining that a conflict exists in migrating the instance from the first version to second version, wherein the conflict relates to the task; and
causing an interface to be presented to a user for resolving the conflict.

12. The medium of claim 11, wherein migrating the instance to the second version includes:
maintaining a portion of the instance data of the first instance that defines one or more values that correspond to the first version, but are not used by the second version of the workflow.

13. The medium of claim 11, wherein the operations further comprise:
in response to receiving a request to create a given instance of the workflow, creating the given instance based on the current version of workflow.

14. The medium of claim 11, wherein the operations further comprise:
causing an interface to be presented to a user that allows for tasks to be added to ones of the set of instances, wherein tasks available to be added to a given one of the set of instances are based on the version associated with that given instance.

15. A method, comprising:
storing, by a first computer system at a second computer system, workflow information that indicates different versions of a workflow, wherein the workflow information is accessible via the second computer system;
receiving, by the first computer system, requests to create instances of the workflow, wherein the requests include a request to create an instance having a first version of the workflow;
creating, by the first computer system, a set of instances of the workflow, wherein each of the created set of instances is associated with a respective one of the different versions, and wherein data resulting from processing a given one of the created set of instances is stored at a data repository local to the first computer system;

receiving, by the first computer system, a request to migrate the instance to a second version of the workflow that is different from the first version associated with the instance; and migrating, by the first computer system, the instance to the second version of the workflow, such that data resulting from processing the instance is handled in accordance with the second version of the workflow, wherein the migrating includes:

accessing, via the second computer system, the first and second versions;

determining that a conflict exists in migrating the instance from the first version to second version, wherein the conflict relates to a task; and causing an interface to be presented to a user for resolving the conflict.

16. The method of claim 15, wherein the instance is migrated from a non-current version of the workflow to a current version of the workflow.

17. The method of claim 15, wherein the second version specifies a set of properties of the workflow, and wherein the data resulting from processing the instance includes one or more data values that correspond to one or more properties in the set of properties.

18. The method of claim 17, wherein one of the set of properties specifies a user input field, and wherein the data resulting from processing the instance includes a particular data value provided by a user for the user input field.

* * * * *